(12) United States Patent
Shilimkar et al.

(10) Patent No.: US 11,824,848 B2
(45) Date of Patent: Nov. 21, 2023

(54) ON DEMAND OPERATIONS ACCESS TO CLOUD CUSTOMER RESOURCES

(71) Applicant: Oracle International Corporation, Redwood Shores, CA (US)

(72) Inventors: Santosh Shilimkar, San Jose, CA (US); Shankar Venugopal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 286 days.

(21) Appl. No.: 17/219,836

(22) Filed: Mar. 31, 2021

(65) Prior Publication Data
US 2022/0329583 A1 Oct. 13, 2022

(51) Int. Cl.
*H04L 29/06* (2006.01)
*H04L 9/40* (2022.01)
*H04L 12/46* (2006.01)

(52) U.S. Cl.
CPC ...... *H04L 63/0823* (2013.01); *H04L 12/4633* (2013.01); *H04L 63/0435* (2013.01); *H04L 63/102* (2013.01); *H04L 63/108* (2013.01); *H04L 63/20* (2013.01)

(58) Field of Classification Search
CPC ............. H04L 63/0823; H04L 12/4633; H04L 63/0435; H04L 63/102; H04L 63/108; H04L 63/20
See application file for complete search history.

(56) References Cited

U.S. PATENT DOCUMENTS

| 2007/0157024 A1* | 7/2007 | Miller | G06F 21/305 713/168 |
| 2013/0014263 A1* | 1/2013 | Porcello | H04L 63/0272 726/25 |
| 2014/0052994 A1* | 2/2014 | Sabin | H04L 9/3247 713/176 |
| 2015/0254773 A1* | 9/2015 | Drake | G06F 16/903 705/37 |
| 2019/0089597 A1* | 3/2019 | Pathak | H04L 41/5051 |

FOREIGN PATENT DOCUMENTS

WO  WO-2012084257 A1 *  6/2012  ......... H04L 12/5815

OTHER PUBLICATIONS

Lauber, S., "Passwordless SSH using public-private key pairs," RedHat, URL: https://www.redhat.com/sysadmin/passwordless-ssh, dated Sep. 6, 2019.
"The Best Way to Manage SSH Keys," KeyFactor, URL: https://www.keyfactor.com/blog/the-best-way-to-manage-ssh-keys/, dated Sep. 23, 2020.

(Continued)

Primary Examiner — Shawnchoy Rahman
(74) Attorney, Agent, or Firm — Vista IP Law Group, LLP

(57) ABSTRACT

Disclosed is an approach to implement an on-demand secure communications channel to a cloud-related resource that is located in a customer's on-premises data center, where the on-demand channel provides access to the resource to a cloud provider's operator employees. This creates on a temporary basis all of the infrastructure that is needed to allow the operational access to the customer system, which can then be destroyed once it is no longer needed.

27 Claims, 7 Drawing Sheets

(56) References Cited

OTHER PUBLICATIONS

Hareven, O., "Eliminating SSH Keys is Possible by Using SSH Certificates Instead," Akeyless, URL: https://www.akeyless.io/blog/eliminating-ssh-keys-is-possible/, dated May 17, 2020.
Niedringhaus, C., "Give Remote User Admin Rights on Windows," JumpCloud, URL: https://jumpcloud.com/blog/remote-user-windows-admin-rights, dated May 19, 2020.
Whitney, L., "How to enable and disable the Administrator account in Windows 10," TechRepublic, URL: https://www.techrepublic.com/article/how-to-enable-and-disable-the-administrator-account-in-windows-10/, dated Feb. 17, 2020.
"Oracle Exadata Database Machine Consolidation: Segregating Databases and Roles," An Oracle White Paper, dated Jul. 2020.
"Oracle Exadata Database Machine Security Guide for Exadata Database Machine," Oracle, Version 19.1.0, dated Oct. 2018.

\* cited by examiner

ON DEMAND OPERATIONS ACCESS TO CLOUD CUSTOMER RESOURCES

BACKGROUND

In a cloud computing environment, computing systems may be provided as a service to customers. One of the main reasons for the rising popularity of cloud computing is that the cloud computing model typically allows customers to avoid or minimize both the upfront costs and ongoing costs that are associated with maintenance of IT infrastructures. Moreover, the cloud computing paradigm permits high levels of flexibility for the customer with regards to its usage and consumption requirements for computing resources, since the customer only pays for the resources that it actually needs rather than investing in a massive data center infrastructure that may or may not actually be efficiently utilized at any given period of time.

The cloud resources may be used for any type of purpose or applicable usage configuration by a customer. For example, the cloud provider might host a large number of virtualized processing entities on behalf of the customer in the cloud infrastructure. The cloud provider may provide devices from within its own infrastructure location that are utilized by the cloud customers. In addition, the cloud provider may provide various services (e.g., database services) to customers from the cloud. As yet another example, the cloud provider may provide the underlying hardware device to the customer (e.g., where the device is located within the customer's own data center), but handle implementation and administration of the device as part of the cloud provider's cloud environment.

One of the main functions performed by the cloud provider in the cloud computing model is the administration and maintenance of the cloud computing resources. By having the administrative staff of the cloud provider take control over these administrative tasks, this minimizes the need and costs for the customer to maintain its own IT staffing and infrastructure to handle these tasks, which is in essence one of the main advantages of the cloud computing paradigm for customers. To perform these tasks, the typical scenario is for the cloud provider's administrative staff to have full and unfettered ability to access and perform administrative functions within the cloud resources.

Consider the scenario where the customer of the cloud provider installs a server or device at the customer's own on-premises location that is intended to be integrated in some way with the cloud environment and/or administratively managed by the cloud provider. For example, a customer may choose to purchase a "cloud in a box" device from a cloud provider, in which the device implements deployable hardware and software functionality in an integrated manner (e.g., a cloud in a box machine that hosts a cloud-based database management server), where the device may be configured to either integrate with the cloud-provider's cloud infrastructure or to function as a stand-alone device in the customer's own data center. In this situation, there may be frequent occasions where an operator from the cloud provider needs to access the on-premises device to perform various administrative operations. In the past this was achieved by maintaining a persistent channel over which the cloud provider's operations team is able to access the remote host that is within the customer's on-premises environment.

One significant problem with this approach is that it may be problematic for customers to allow an external party to have access into the customer's computing infrastructure of an extended and indeterminate length. Indeed, this approach raises concerns since the customers may not be able to choose or control the operational access to the hosts that are present in their data center. For instance, this may be particularly a problem for regulated customers (such as banks and medical providers) that need to comply with applicable contractual or legal requirements regarding responsibilities and obligations for strictly controlling the actions for access to their computing systems and data, where this responsibility is independent of the ownership of the equipment or the origin of the staff performing the actions on the equipment. Moreover, regulated customers often have to prove to their regulators that they are in complete control of these systems, and that they are operating their systems in compliance with those regulations. These requirements for the regulated customers may be in conflict with the conventional cloud computing scenario where the cloud provider's administrative operators—and not the cloud customer—have significant control over access to some or all of the customer's infrastructure resources.

Therefore, there is a need for an improved approach to implement a solution that addresses the issues identified above.

SUMMARY

Some embodiments of the invention are directed to an approach to implement an on-demand secure communications channel to a cloud-related resource that is located in a customer's on-premises data center, where the on-demand channel provides access to the resource for the cloud provider's operator employees. This creates on a temporary basis all of the infrastructure that is needed to allow the operational access to the customer system, which can then be destroyed once it is no longer needed. The on-demand channel would be created from the direction of the client/customer to the cloud to facilitate such channels even if the client/customer system does not allow incoming connections from the cloud.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments are directed to an approach to implement an on-demand secure communications channel to a cloud-related resource that is located in a customer's on-premises data center, where the on-demand channel provides access to the resource for a cloud provider's operator employees. This creates on a temporary basis all of the infrastructure that is needed to allow the operation access to the customer system, which can then be destroyed once it is no longer needed. The on-demand channel would be created from the direction of the client/customer to the cloud to facilitate such channels even if the client/customer system does not allow incoming connections from the cloud.

Figure 1:
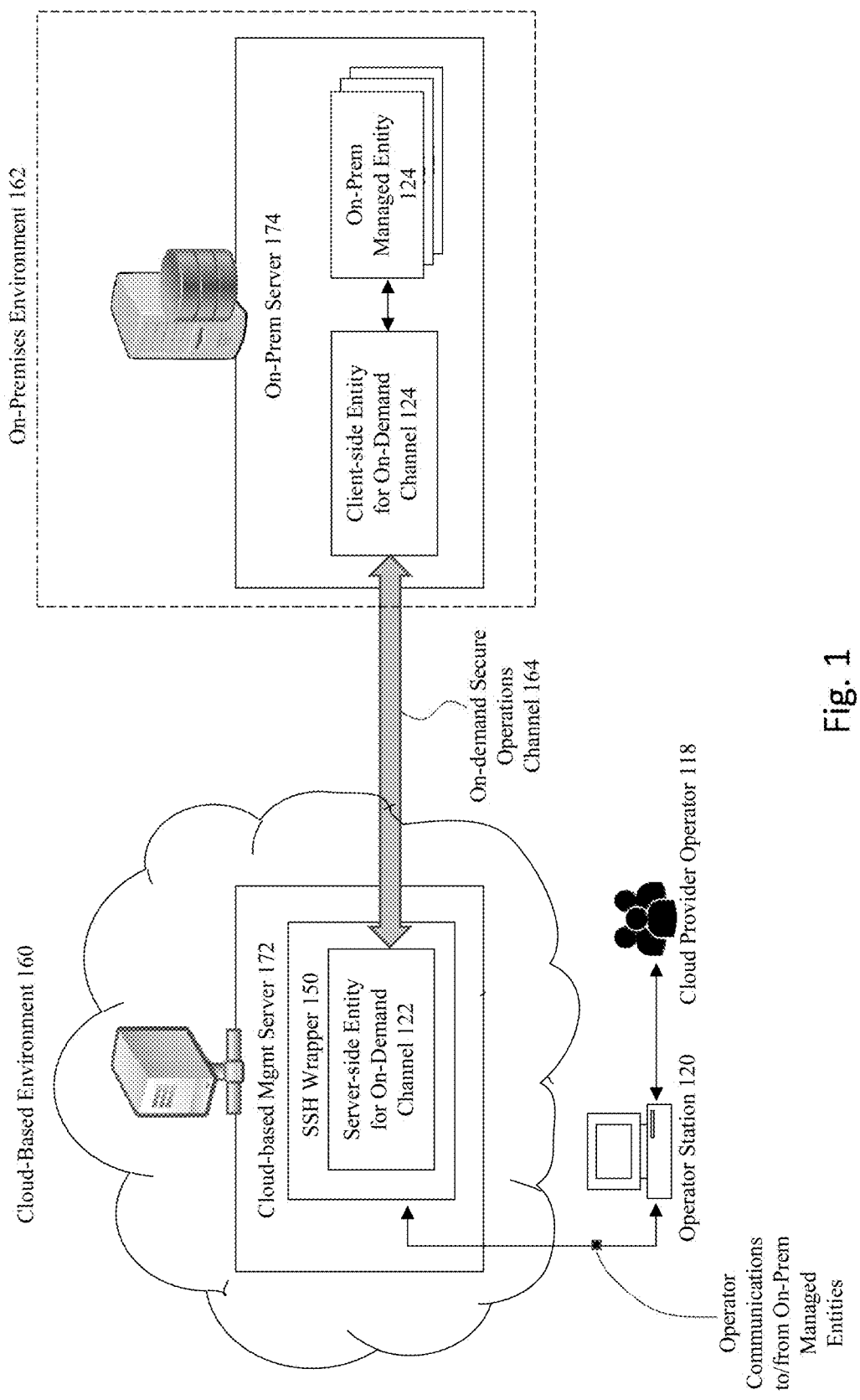
FIG. 1 provides a high level illustration of the invention according to some embodiments of the invention.

FIG. 1 provides a high level illustration of the invention according to some embodiments of the invention. This figure shows a cloud computing system that includes a cloud-based environment 160 and on-premises environment 162. The cloud-based environment 160 corresponds to any environment that may be provided by a cloud provider and which includes cloud-based resources such as a cloud-based server 172. The on-premises environment 162 may include cloud-related infrastructure/computing resources that are installed within an on-premises location, such as a data center at the customer location.

The cloud-related resources in the on-premises environment corresponds to any type of infrastructure resource that may be allocated and used within a cloud computing environment. For example, the cloud infrastructure resource may correspond to a hardware device (such as server 174) that is shipped to a customer to use in the customer's own data center, but where the device forms part of a cloud provider's cloud environment that is maintained by the cloud provider's administrative employees. In this cloud deployment model, the customer may be responsible for the application/user-space level activities on the device. However, the cloud provider may be responsible for management of the infrastructure components for that device (e.g., infrastructure software, chassis power, bare metal operating system, hypervisors, storage services, networking services, etc.).

As discussed above, there may be numerous occasions where an operator 118 at an operator station 120 from the cloud-based environment 160 needs to access the on-premises device 174 in the on-premises environment 162 to perform various administrative operations. In the conventional implementations of these models, this was achieved by maintaining a persistent channel over which the cloud provider's operations team is able to access the remote host that is within the customer's on-premises environment. While this model works for some portions of the cloud market, this model works poorly, or does not work at all, for regulated customers, such as banks and medical providers. As previously noted, the primary reason for this problem is that a regulated customer is responsible for controlling access and actions on their systems, and this responsibility is independent of the owner of the equipment or the origin of the staff performing actions on said equipment. Moreover, regulated customers often have to prove to their regulators that they are in complete control of these systems, and that they are operating their systems in compliance with those regulations.

To address these issues, some embodiments of the invention provide an on-demand secure operations channel 164 to facilitate communications between a management server 172 in the cloud-based environment 160 and a server 174 in the on-premises environment 162. The on-demand channel 164 is not a persistent channel that is continuously open, but is instead a channel that is only created upon the need to implement operator communications with the on-premises server 174. In effect, the ability to create the on-demand channel 164 (instead of being required to maintain a persistent channel) allows the cloud customer to manage the extent, timing, and approval process for giving operator 118 access to the server 174 in the on-premises environment 162.

In some embodiments, the on-demand channel 164 is created by using an on-demand SSH (secure shell) service. SSH is a cryptographic network protocol for implementing and operating network services in a secure manner over a network, and is commonly used for administrative or operational access to a system. In the current embodiment, a SSH wrapper 150 is provided that outwardly looks to the operator's system to function as if normal SSH-based operations are used to implement operator commands. However, under the covers of the SSH wrapper 150, a server-side mechanism 122 interfaces with a client-side mechanism 124 to implement the on-demand nature of the channel 164. This permits the operator 118 to issue command and control through the on-demand channel 164 to perform administrative or operational tasks on one or more managed entities 124 within the server 174 in the on-premises environment 162.

In particular, a TCP port (e.g., TCP port 443) may be used to service HTTPS communications between the two locations. This would be the port opened by the customer for the communications. The activities of the operator are performed on top of TLS (transport layer security) through that opened port. As discussed in more detail below, components on both the server and client sides are used to open this temporary communications path between the cloud-based server and the on-premises server.

Figure 2:
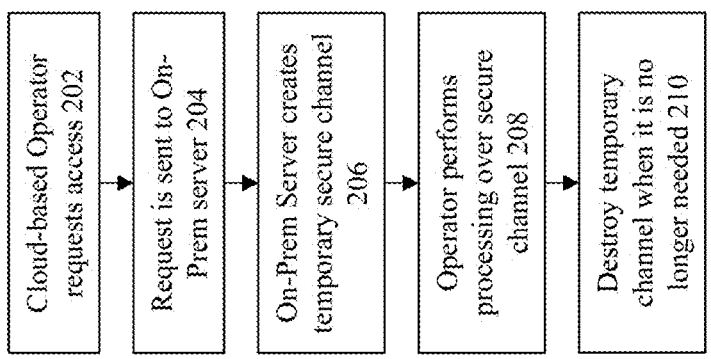
FIG. 2 shows a high-level flowchart of steps to implement an on-demand secure operations channel according to some embodiments of the invention.

FIG. 2 shows a high-level flowchart of steps to implement an on-demand secure operations channel according to some embodiments of the invention. At 202, the cloud-based operator initiates a request to access the on-premises resource. This may occur, for example, when the cloud operator's station issues a call to the SSH wrapper to perform a requested operation.

At step 204, a request is sent to the on-premises server to open the on-demand channel. As discussed in more detail below, at step 206, the client-side on-demand SSH service at the on-prem server will validate the request from the server-side components, and will perform the actions necessary to open the secure on-demand channel. Thereafter, at step 208, the operator will perform the desired administrative or operational processing that is needed over the on-demand channel.

Once the on-demand channel is no longer needed, then at step 210, that temporary channel (along with any associated keys, certificates, or other temporary items) can then be destroyed. For example, a timeout period can be established, whereby the lack of any operational activity in that "idle" timeout period will result in the destruction of the temporary channel.

Figure 3:
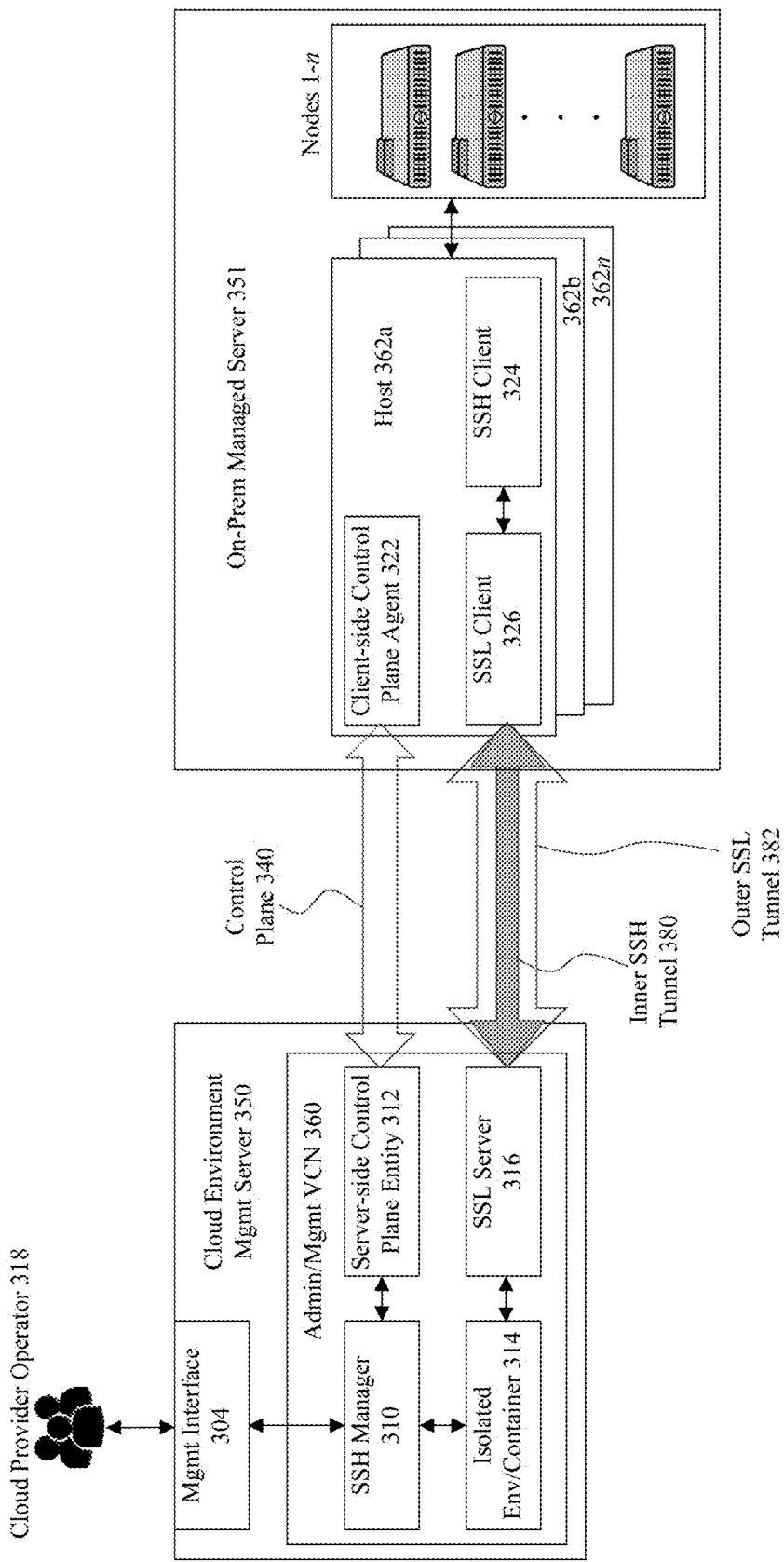
FIG. 3 shows a more detailed diagram of an architecture for implementing some embodiments of the invention.

FIG. 3 shows a more detailed diagram of an architecture for implementing some embodiments of the invention. As an illustrative example, this architecture may be used in the situation where the on-prem server is a "cloud-in-a-box" device such as the "Oracle Exadata Cloud at Customer" product provided by Oracle Corporation, where Exadata database racks are remotely managed by control plane services running in a public cloud (e.g., the Oracle Public Cloud). Communications are needed between the two locations for automation and LCM (Life Cycle Management) operations. As such, the database racks need to be accessed by a cloud-based operations team on occasions for maintenance or troubleshooting. However, many customers do not want any permanent access to servers in their data centers and hence wants the operational access open only for the maintenance window and closed after the maintenance.

In the cloud environment of the current architecture, one or more operators 318 may use a management interface 304 to perform their necessary administrative or operations activities from a cloud-based management server 350 to an on-prem managed server 351. An administrative VCN (virtual cloud network) 360 includes a SSH manager 310 to manage the server-side implementation of the on-demand channel.

A HTTP/REST-based communications path may exist between the cloud-based management server 350 and the on-prem managed server 351, where the HTTP/REST-based path is embodied as a control plane 340. A server-side control plane entity/agent 312 may interact with a client-side control plan entity/agent 322 to communicate over the control plane. Only HTTP/REST calls are allowed over the control plane 340.

However, in the event that operational or maintenance activities need to be performed at a host 362a-n within the on-prem server 351, the operator 318 may need to log in to a host 362a to perform those activities. The control plane 340 cannot be used to implement this type of access since the REST-based communications model normally does not include a L3 layer extension that would allow a user to perform log ins to the on-prem resources.

With the current embodiment of the invention, a SSH-based tunnel solution is implemented to resolve these issues. The cloud-based management server 350 includes a server-based SSL component 316 and the on-prem managed server 351 includes a client-based SSL component 326 to implement an outer SSL tunnel 382. An inner SSH reverse tunnel 380 is created within the outer SSL tunnel 382 using a SSH client 324 at the on-prem location and an isolated environment entity/container 314 at the cloud location.

In operation, the on-demand SSH service makes a REST call to the control plane to request the remote host to generate the ephemeral SSL certificates and SSH Keys. The control plane makes a REST call to control plane agent running in the remote host to generate the SSL Certs and SSH Keys. The control plane agent generates ephemeral keys and send the SSL public cert and SSH public key as response.

Once the SSH service at the cloud-side receives the Certificates and Keys, it spawns the isolated environment (e.g., in a container) for the remote host and starts the SSH server in the isolated environment. A setup is performed of the SSL server to forward all the connections of specific SSH to the corresponding isolated environment.

The SSH Service then makes a REST call to the control plane to create the reverse SSH tunnel from remote host to the isolated environment. The control plane agent in the remote host creates the reverse SSH tunnel over the SSL tunnel to the isolated environment. This SSH reverse tunnel opens up a port in the isolated environment which is used to create the SSH session to the remote host.

Once the SSH session operation is complete, the isolated environment is destroyed and the SSH Service makes REST call to control plane agent (via the control plane) to clean up the certificates and the keys in the remote host.

Figure 4:
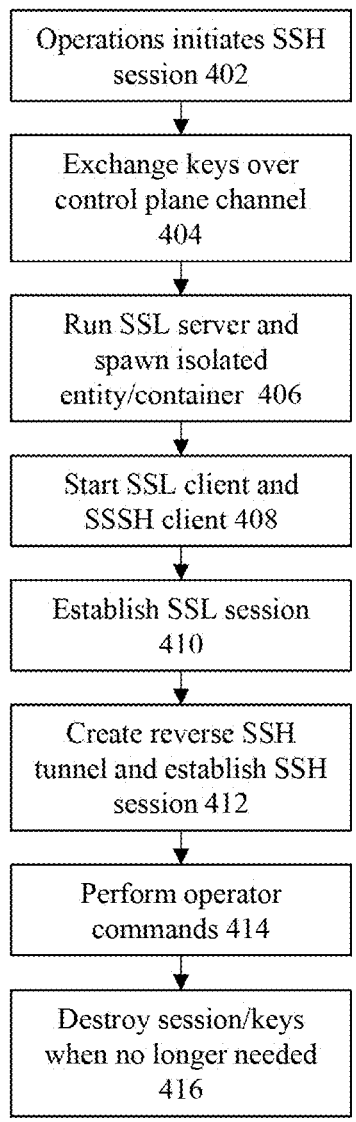
FIG. 4 shows a detailed flowchart of steps that are performed to implement the on-demand secure channel.

FIG. 4 shows a detailed flowchart of steps that are performed to implement the on-demand secure channel. At step 402, the operator will initiate the SSH session to CPS or to one or more managed resources (e.g., DB Nodes) on the on-prem server. For example, the operator may intend to perform some sort or troubleshooting or maintenance activities for managed entities at the client-side server. The SSH request will be initiated at the cloud-side, which identifies (e.g. using a unique identifier) the specific entity for which access is requested. This causes an API call to be made to an interface component for the desired access.

Thereafter, at step 404, SSL public certificates and SSH keys of the CPS are created. In some embodiments, the certificates and keys are created on a per-rack basis (e.g., for each database rack for the cloud-at-customer system located at the customer on-prem location). The certificates and keys are exchanged over the secure control plane channel using REST APIs, e.g., where the necessary key pairs are created and the public keys are sent to the cloud-side.

The management host will, at step 406, run an SSL server and create an isolated environment for SSH. In some embodiments, a Stunnel Server is run to implement the SSL server, where Stunnel is a tool that includes a proxy to implement TLS functionality between clients and servers. In addition, a Docker container is spawned to implement the isolated environment. In some embodiments, the Docker container is spawned for each cloud-at-customer system rack.

At 408, the SSL client and the SSH client will be started at the on-prem location. In some embodiments, the control plane agent will starts the Stunnel client (SSL Client) and the SSH client. At 410, the SSL session will now be established. The previous key exchange process (exchanged SSL public keys) is used to authenticate that the connection is for correct entity. In the current embodiment, the Stunnel Client will establish a mTLS SSL session with the Stunnel Server.

At this point, at 412, the SSH Client now creates a reverse SSH tunnel over STunnel to the cloud-based management server. The previous key exchange process (e.g., the exchanged key pairs) is used to authenticate that the connection is for the correct entity. The SSH server will accept the connection from the SSH client, which establishes the reverse SSH tunnel.

At 414, the operations SSH session to the managed entities (e.g., CPS or DB Nodes) will be established at this step. At this point, the operator may proceed with the operational or administrative activities. The operator will send instructions from the cloud-side to the on-prem side using the SSH protocol to effect the desired activities of the operator.

Once the maintenance operations are done, then at 416, the on-demand channel will be destroyed. This occurs by monitoring and checking for both active and inactive sessions, where the inactive sessions are destroyed. As previously noted, a timeout period (e.g., one hour) can be established to check for any inactive/idle sessions that should be destroyed. Upon identifying a session to destroy, the system will destroy the dedicated Docker container, SSH keys, SSL keys and any metadata associated with that session.

Figure 5:
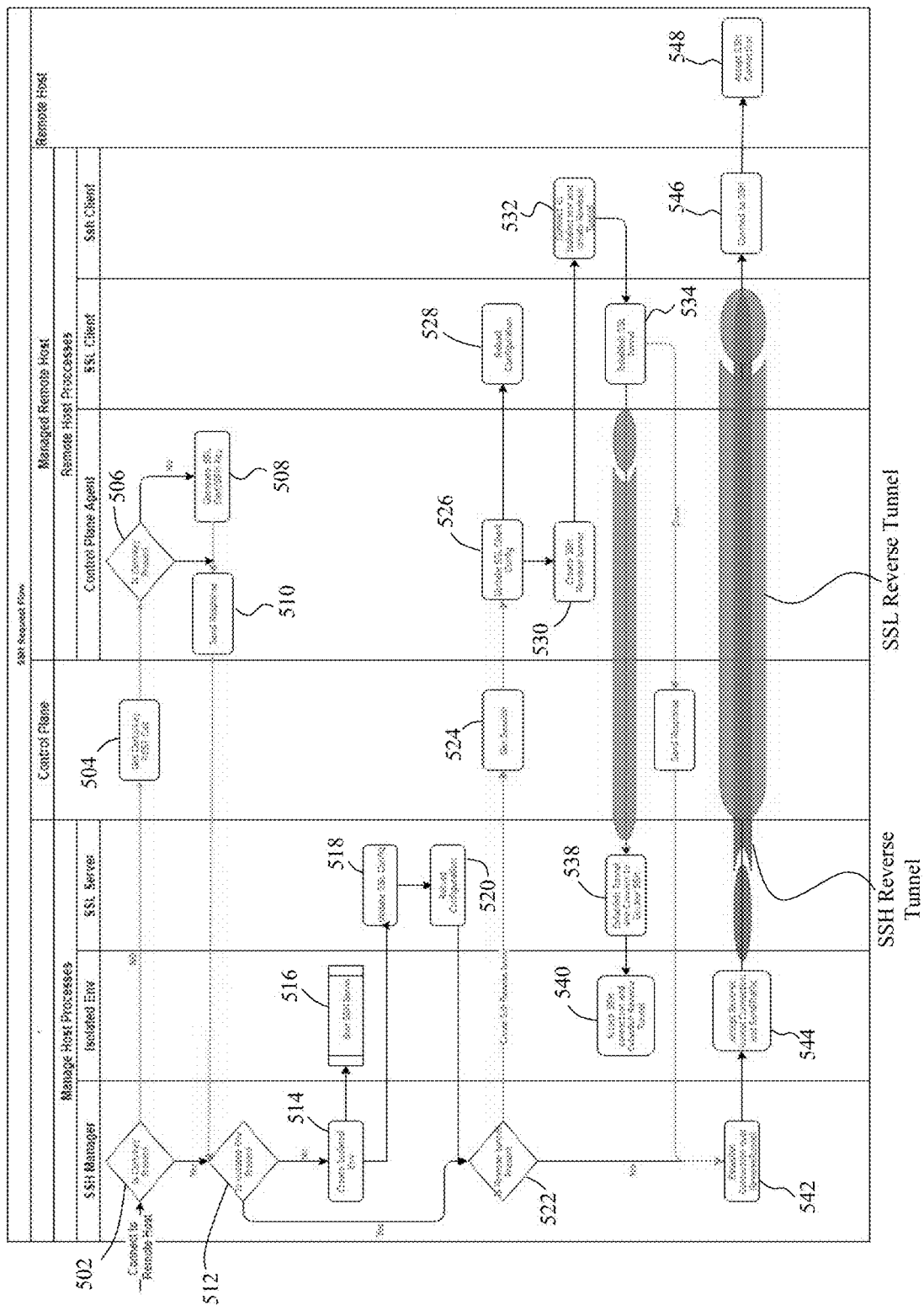
FIG. 5 illustrates a process flow that identifies actions by specific components within the system according to some embodiments of the invention.

FIG. 5 illustrates a process flow that identifies actions by specific components within the system according to some embodiments of the invention. The process begins with a request for a connection to the remote host, where at 502, a determination is made whether the required certificates or keys already exist. As previously noted, a temporary channel may be created and exist for a certain idle timeout period before it is destroyed. Therefore, step 502 is performed to check whether the certificates/keys from a previous session already exists, and if not, then the process proceeds to step 504 to obtain the certificates/keys via a REST call. The call is made to the control plane agent at the on-prem side where, at step 506, a determination is made whether the certificates/keys already exist. If not, then the necessary certificates and leys are generated at step 508. A response with the necessary certificates/keys is provided at step 510.

At 512, a determination is made whether an isolated environment already exists for the requested session. For example, this check is made to determine whether a Docker container already exists for a previously-created session that has not yet been destroyed. If the isolated environment does not exist, then it is created at step 514. Thereafter, at 516, the SSH server is started within the isolated environment. For the SSL server, its SSL configuration is updated at 518 to reflect the circumstances of the current session. That configuration is then loaded for the SSL server at 520.

At 522, a determination is made whether a reverse tunnel already exists for the requested session. If not, then at 524, a request is made through the control plane to obtain the session and to create the reverse tunnel. At 526, the control plane agent at the on-prem side will update its SSL client configurations for the current session, which is loaded in the SSL client at 528. At 530, the control plane initiates the SSH reverse tunnel establishment. The following steps are performed with regards to, and are substeps of, the establishment of the SSH reverse tunnel at step 530. At 532, the SSH client will now initiate a connection to the isolated environment and create a reverse tunnel. The SSL tunnel is thereafter established by the SSL client at 534. At 538, the tunnel is established to the SSL server, and a connection is made to the SSH server (e.g., a Docker-based SSH server). At 540, the SSH server in the isolated environment accepts the SSH connection and will implement the establishment of the SSH reverse tunnel.

The SSH manager, at 542, will now establish a connection over the reverse tunnel. At 544, the isolated environment accepts the reverse tunnel connection and will send network traffic corresponding to the operator activities. At 546, this connects to the SSH client at the on-prem location, and at 548, the remote host will accept the SSH connection. The packets from the operator are routed to the appropriate managed entity (e.g., the specific DB node that needs maintenance or troubleshooting) at the remote host.

Therefore, what has been described is an improved approach to implement connections between a cloud-based environment and a managed host in an on-prem environment, where the access is embodied as an on-demand secure channel that is only opened as a temporary basis rather than as a persistent connection.

System Architecture

Figure 6:
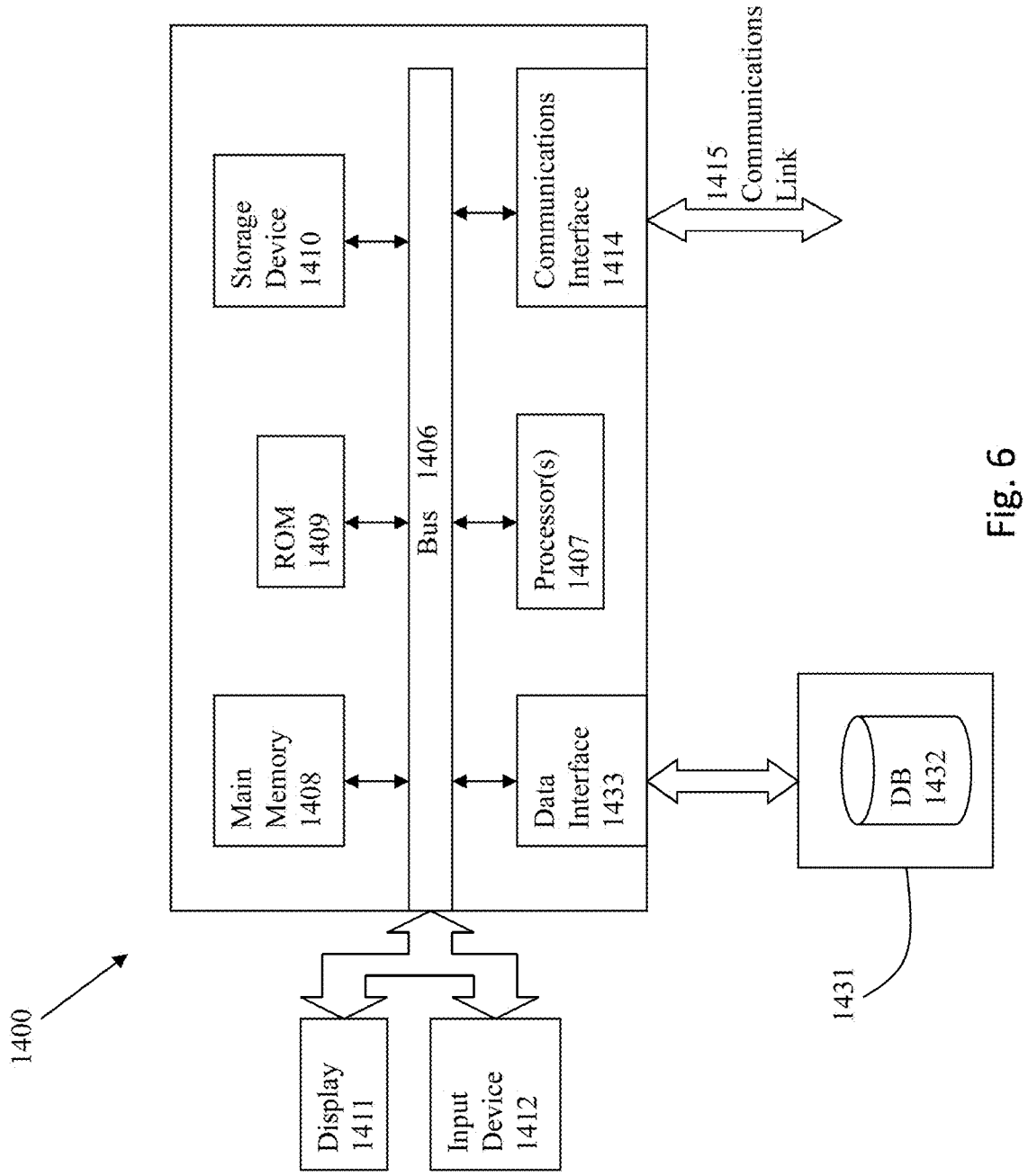
FIG. 6 is a block diagram of an illustrative computing system suitable for implementing an embodiment of the present invention.

FIG. 6 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 7:
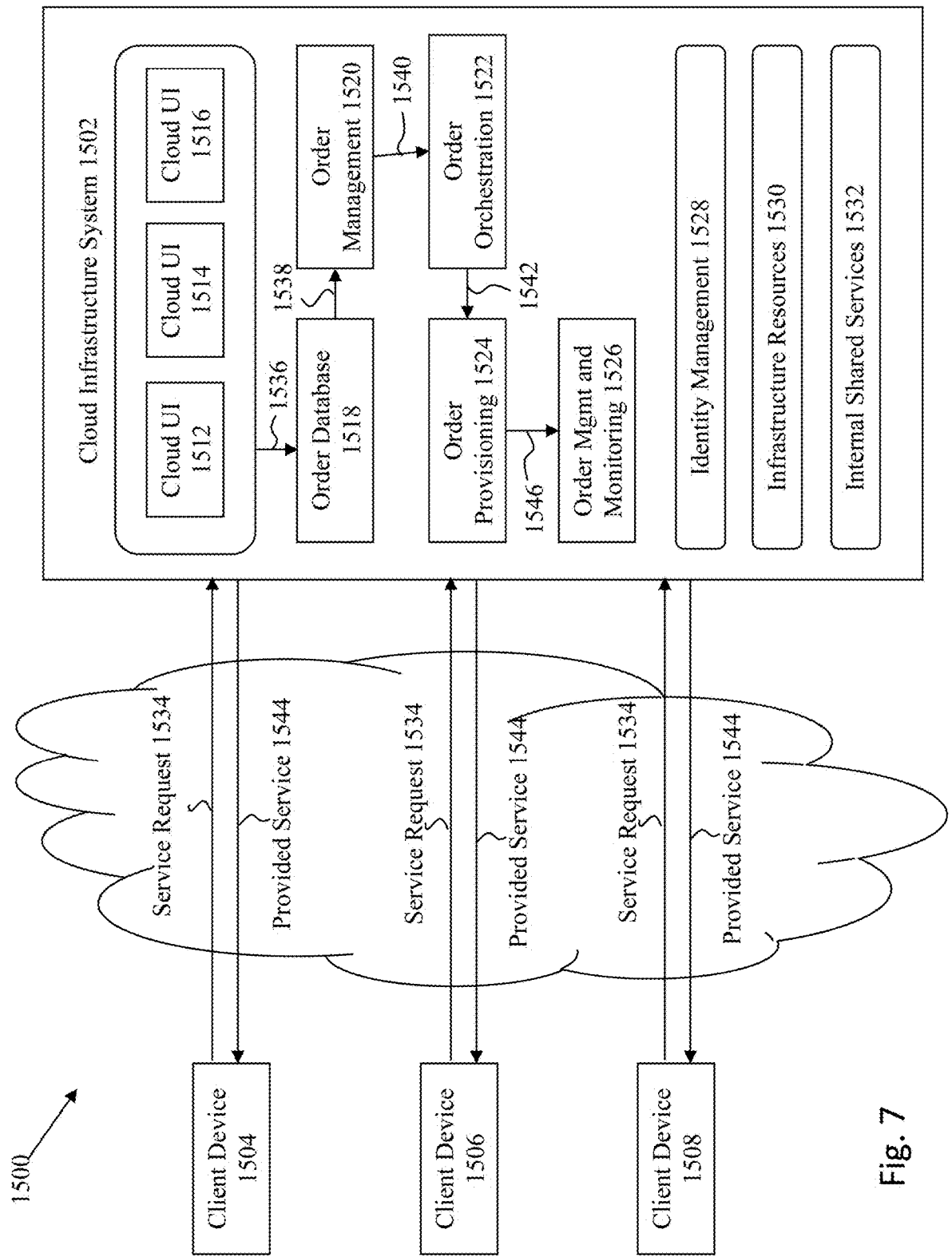
FIG. 7 is a block diagram of one or more components of a system environment in which services may be offered as cloud services, in accordance with an embodiment of the present invention.

FIG. 7 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for FIG. 6. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order.

Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   receiving a request to establish a connection between a cloud-based environment and an on-premises environment;
   sending the request from the cloud-based environment to the on-premises environment, wherein a temporary communications channel is established from the on-premises environment to the cloud-based environment; and
   sending network communications to implement operational or administrative activities from the cloud-based environment to the on-premises environment over the temporary communications channel;
   wherein the temporary communications channel is destroyed when it is determined that the temporary communications channel is no longer needed.

2. The method of claim 1, wherein the temporary communications channel comprises a reverse inner tunnel created within an outer tunnel.

3. The method of claim 2, wherein the reverse inner tunnel is a SSH tunnel and the outer tunnel is a SSL tunnel.

4. The method of claim 2, wherein a SSH wrapper is established in the cloud-based environment to access the temporary communications channel.

5. The method of claim 2, wherein the reverse inner tunnel connects to an isolated environment at the cloud-based environment.

6. The method of claim 5, wherein the isolated environment is implemented as a container.

7. The method of claim 1, wherein a REST-based control plane is used to initiate the request from the cloud-based environment to the on-premises environment.

8. The method of claim 7, wherein an agent at the on-premises environment establishes certificates and keys based upon the request initiated through the REST-based control plane, the certificates and keys used to authenticate a connection for a specific entity.

9. The method of claim 1, wherein a timeout period is established to destroy the temporary communications channel.

10. A computer program product embodied on a non-transitory computer readable medium, the non-transitory computer readable medium having stored thereon a sequence of instructions which, when executed by a processor, executes a method comprising:
    receiving a request to establish a connection between a cloud-based environment and an on-premises environment;
    sending the request from the cloud-based environment to the on-premises environment;
    creating, from the on-premises environment to the cloud-based environment, a temporary communications channel; and
    sending network communications to implement operational or administrative activities from the cloud-based environment to the on-premises environment over the temporary communications channel;
    wherein the temporary communications channel is destroyed when it is determined that the temporary communications channel is no longer needed.

11. The computer program product of claim 10, wherein the temporary communications channel comprises a reverse inner tunnel created within an outer tunnel.

12. The computer program product of claim 11, wherein the reverse inner tunnel is a SSH tunnel and the outer tunnel is a SSL tunnel.

13. The computer program product of claim 11, wherein the sequence of instructions when executed by the processor establishes a SSH wrapper in the cloud-based environment to access the temporary communications channel.

14. The computer program product of claim 11, wherein the reverse inner tunnel connects to an isolated environment at the cloud-based environment.

15. The computer program product of claim 14, wherein the isolated environment is implemented as a container.

16. The computer program product of claim 10, wherein the sequence of instructions when executed by the processor uses a REST-based control plane to initiate the request from the cloud-based environment to the on-premises environment.

17. The computer program product of claim 16, wherein an agent at the on-premises environment establishes certificates and keys based upon the request initiated through the REST-based control plane, the certificates and keys used to authenticate a connection for a specific entity.

18. The computer program product of claim 10, wherein the sequence of instructions when executed by the processor establishes a timeout period to destroy the temporary communications channel.

19. A system, comprising:
a processor;
a memory for holding programmable code; and
wherein the programmable code includes instructions executable by the processor for receiving a request to establish a connection between a cloud-based environment and an on-premises environment; sending the request from the cloud-based environment to the on-premises environment; creating, from the on-premises environment to the cloud-based environment, a temporary communications channel; sending network communications to implement operational or administrative activities from the cloud-based environment to the on-premises environment over the temporary communications channel; wherein the temporary communications channel is destroyed when it is determined that the temporary communications channel is no longer needed.

20. The system of claim 19, wherein the temporary communications channel comprises a reverse inner tunnel created within an outer tunnel.

21. The system of claim 20, wherein the reverse inner tunnel is a SSH tunnel and the outer tunnel is a SSL tunnel.

22. The system of claim 20, wherein the instructions when executed by the processor establishes a SSH wrapper in the cloud-based environment to access the temporary communications channel.

23. The system of claim 20, wherein the reverse inner tunnel connects to an isolated environment at the cloud-based environment.

24. The system of claim 23, wherein the isolated environment is implemented as a container.

25. The system of claim 19, wherein the instructions when executed by the processor uses a REST-based control plane to initiate the request from the cloud-based environment to the on-premises environment.

26. The system of claim 25, wherein an agent at the on-premises environment establishes certificates and keys based upon the request initiated through the REST-based control plane, the certificates and keys used to authenticate a connection for a specific entity.

27. The system of claim 19, wherein the instructions when executed by the processor establishes a timeout period to destroy the temporary communications channel.

* * * * *